INVENTORS.
WALTER W. TREVILLIAN
ROLAND J. DOTTERWEICH
BY Jacobi & Davidson
ATTORNEYS.

INVENTORS.
WALTER W. TREVILLIAN
ROLAND J. DOTTERWEICH
BY Jacobi & Davidson
ATTORNEYS.

United States Patent Office 3,321,136
Patented May 23, 1967

3,321,136
TEMPERATURE REGULATING PROCESS AND SYSTEM
Walter W. Trevillian and Roland J. Dotterweich, both of Baltimore, Md., assignors to B. H. Hubbert & Sons, Inc., a corporation of Maryland
Filed Apr. 25, 1966, Ser. No. 545,063
3 Claims. (Cl. 237—9)

The present invention relates to a temperature regulating process and system, and in particular it relates to a process and system for regulating the temperature of a heated fluid being supplied to a remote location to thereby assure that the temperature at said remote location will remain substantially at a preselected level.

While the present invention has utility in various applications in the general field of fluid delivery and temperature regulation, it is particularly applicable to cooking systems wherein a plurality of cooking kettles are heated by means of steam to a desired temperature. In cooking foods at large institutional or industrial concerns, a plurality of steam heated cooking kettles are provided, with the steam for all such kettles being supplied from a common input line. Naturally, the temperature to which any particular kettle is to be heated is determined by the food which is to be cooked within that kettle. Thus, for each particular food to be cooked in each particular kettle, there is a certain "selected temperature" at which such cooking is best accomplished. As used in the context of this specification and claims, the term "selected temperature" need not be limited to a particular single temperature, but instead, can refer to a permissible narrow range of temperatures. For example, if it is desired to heat a food to a "selected temperature" of 250° F., the permissible narrow range for such heating can extend from 240° F. to 260° F. If the cooking temperature falls anywhere within this permissible narrow range, the food within the kettle will be properly cooked. However, if the temperature were to fall outside of this permissible narrow range, for example, a temperature of 300° F., then the food within the kettle would not be properly heated in that it would be "overcooked."

With the foregoing matter in mind, it should be apparent that there is a need for proper temperature regulation for cooking systems of this type. In the past, there have been proposals to regulate the cooking temperature of such kettles by means of a control system in which a "selected temperature" could be pre-set. However, none of these prior art proposals were entirely satisfactory. For example, one such prior art proposal employed an "on-off" technique using a thermocouple. In this arrangement, the thermocouple would be preselected to the desirable narrow range of the "selected temperature," and if the heating temperature at the kettle went below this range, the system would turn "on," whereas if the temperature went above this range, the system would turn "off." While such an arrangement did, in a crude sense, accomplish a temperature regulation at the cooking kettle, it was not the desired versatile type of regulation which was desired by the industry.

Another prior art arrangement for controlling the temperature at cooking kettles, was to use a strictly manual pressure regulation to accomplish the desired temperature control. In such system, a valve within the steam supply line was manually adjusted until the temperature at the kettle reached the desired level. However, the temperature at the kettle would only stay at this desired level so long as the steam pressure within the line remained constant, and if there was any line pressure variation, then the valve had to again be manually readjusted. Naturally, such an arrangement was cumbersome and required continual observation and readjustment.

In contrast to the foregoing, it is an object of the present invention to overcome the difficulties and deficiencies of the prior art arrangements and to provide in their stead, a new and improved system and process for temperature regulation.

Another object of the present invention is to provide a system wherein the temperature regulation at a remote location is controlled by controlling the pressure of the heated fluid flowing to that remote location.

Another object of the present invention is to provide an automatic flow control system which can be adjusted to deliver heated fluid to a remote location at a particular substantially constant pressure which thus has a corresponding particular substantially constant temperature.

Another object of the present invention is to provide a system and process which automatically responds to changes in line conditions to assure that the fluid traveling through such line will arrive at its location at selected temperature and pressure, and wherein, after initial preselected adjustment, no further adjustment or maintainenace be made.

Another object of the present invention is to provide a temperature regulating system and process which operates economically and efficiently to produce the desired results, yet which is relatively inexpensive to install, and which is simple to operate.

Other objects, advantages and salient features of the present invention will become apparent from the following detailed description, which, taken in conjunction with the annexed drawings, discloses a preferred embodiment hereof.

To understand the nature of the present invention, it must be first recognized that there is a direct relationship between the pressure of a heated fluid and the temperature thereof. As aforesaid, the present invention is particularly concerned with the use of steam for the control and regulation of cooking temperatures, and thus by controlling the pressure of this steam, the temperature thereof can be controlled. Thus, in the overall system, steam is provided to a common input line, and a plurality of branch lines extend from this input line to the individual cooking kettles.

Within each such cooking kettle line, a flow control means is provided for regulating the pressure of the steam flowing therethrough to maintain the same at a substantially constant pressure level. A manually adjustable means is also provided, with such means being calibrated to enable the user to select a particular temperature desired at each kettle. The adjustable means for each particular kettle line is controllably coupled to the flow control means for that line to assure that the pressure of the heated fluid will be regulated to a particular substantially constant pressure level which will produce substantially the selected temperature at the kettle.

As an example of the general operation of this system and process, let it first be recognized that a steam pressure of approximately 5 pounds per square inch produces a corresponding temperature of approximately 215° F. Similarly, a steam pressure of 40 pounds per square inch produces a corresponding temperature of approximately 280° F. Now, let it be assumed that for one particular kettle, the selected temperature desired is 280° F. The operator would then set the adjustable means associated with that kettle to the particular setting corresponding to a temperature selection of 280° F. Such adjustment would in turn vary the flow control means associated with the supply pipe for that kettle to assure that steam will constantly be delivered to the kettle at substantially a pressure of 40 pounds per square inch. Of course, as aforesaid, due to lags in response time and so on, the system is not absolute, but instead, operates within a permissible narrow range. Thus, although the flow control means will automatically keep the fluid at substantially a pressure of 40 pounds per square inch, it will not necessarily keep it at exactly that pressure. Accordingly, the temperature produced at the kettle will not necessarily be exactly 280° F., but instead, can vary within a permissible range of plus or minus a few degrees. Nevertheless, so long as the temperature remains within that permissible narrow range, the average cooking temperature produced by the kettle will be approximately 280° F., and this will produce the desired cooking of the food within the kettle.

Referring now to the drawings.

Figure 1:
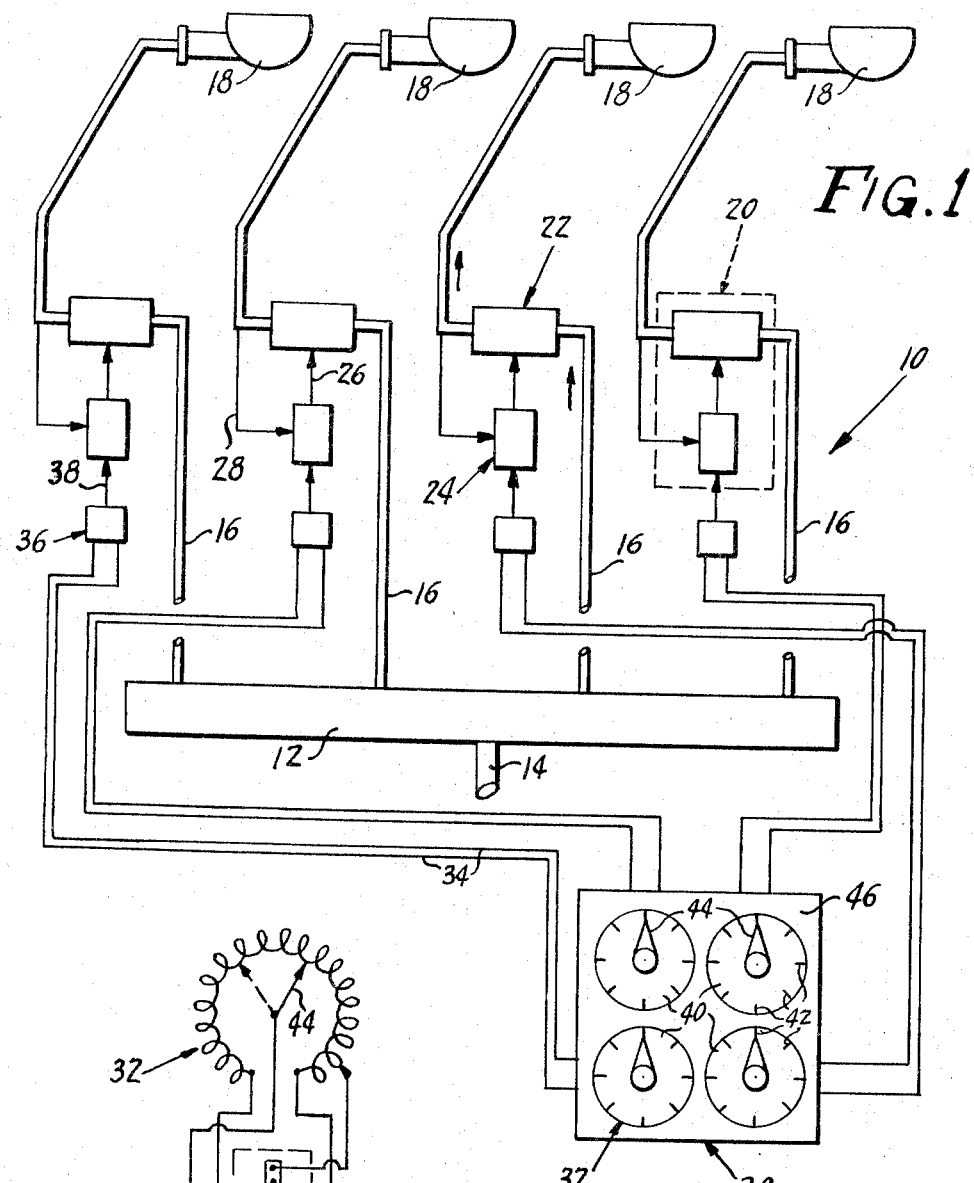
FIGURE 1 is a schematic view of a system in accordance with the principles of the present invention.

Referring now to FIGURE 1 for a more detailed description of the system of the present invention, such system is generally designated 10 and includes a main conduit or pipe 12 having an inlet 14 therein. The steam or other heated fluid to be used in the system 10 is introduced through the inlet 14 into the pipe 12, and such pipe serves as a manifold for a plurality of outlet flow lines 16 each of which connects to a separate cooking kettle 18. Such cooking kettles 18 are of the jacketed type, such as, for instance, that shown and described in United States patent application Serial No. 336,586, filed January 8, 1964, now Patent No. 3,256,904 issued June 21, 1966, by Ralph E. Costa.

A flow control means generally designated 20 is provided in each flow line 16 between the conduit 12 and the kettle 18, with the purpose of such flow control means being to regulate the pressure of the steam or heated fluid passing through the line 16, in a manner to be presently described. Each such flow control means 20 includes a main valve generally designated 22 coupled directly in the line 16 and a control or pilot valve 24 coupled to each main valve 22. A first arrow 26 is shown in FIGURE 1 as extending from each control valve 24 to each main valve 22, and additionally, a second arrow 28 is shown extending from the downstream or low pressure side of the line 16 back to the control valve 24. Thus, the arrows 26 and 28 serve to define and describe the general arrangement whereby the control valve 24 serves to regulate the pressure of the main valve 22. A specific embodiment of this general arrangement will be described shortly hereinafter in connection with FIGURE 2.

Adjustable means generally designated 30 are provided in the system, with such means being calibrated in a manner which enables selection of a temperature desired at the cooking kettles 18. More specifically, the adjustable means 30 includes a plurality of adjustable control units generally designated 32, one such unit being provided for each kettle 18. Each unit 32 is coupled by electrical lead lines 34 to an electromechanical control device generally designated 36. An arrow 38 serves to indicate that each control device 36 is controllably coupled to an associated control valve 24.

Each adjustable control unit 32 includes a dial face 40 having a plurality of calibrations 42 thereupon. An adjustable pointer or knob 44 is juxtaposed to the dial 40 so that the same may be turned to any desired calibration 42. The calibrations 42 on the dial are arranged to enable the selection of a temperature desired at a particular kettle 18. Thus, for simplicity, each of the calibrations 42 could indicate a particular temperature. On the other hand, if desired, each of the calibrations could merely indicate a particular number, such as 1, 2, 3 . . ., with each such number corresponding to a particular temperature, as indicated on a master legend, not shown. For purposes of convenience, all of the control units 32 for one bank of kettles 18 may be mounted on a common control board 46.

For an understanding of the general operation of the present invention, let it be assumed that a particular food is to be cooked in a particular kettle 18. To properly cook this food, the temperature at which the steam is supplied to the kettle must be such as to produce the selected temperature needed for proper cooking. Accordingly, the operator sets the control unit 32 associated with that particular kettle to the temperature desired, and he does so by turning the pointer 44 to a particular calibration 42 on the dial 40. This setting of the control unit 32 causes a corresponding movement of the control device 36, thereby controlling the amount of bias exerted upon the associated control valve 24. The control valve 24, in turn, controls the steam flow through the main valve 22 to assure that the same will deliver a constant pressure to the kettle 18. The particular constant pressure which is supplied is that which will produce the temperature which was pre-selected on the control unit 32. The feed-back 28 from the downstream side of the main valve 22 assures that such valve will be properly regulated or modulated to the proper setting to produce the desired constant downstream pressure. As this downstream pressure reaches the kettle 18, it is at a particular temperature, and this temperature corresponds to that pre-selected on the control unit 32.

Figure 2:
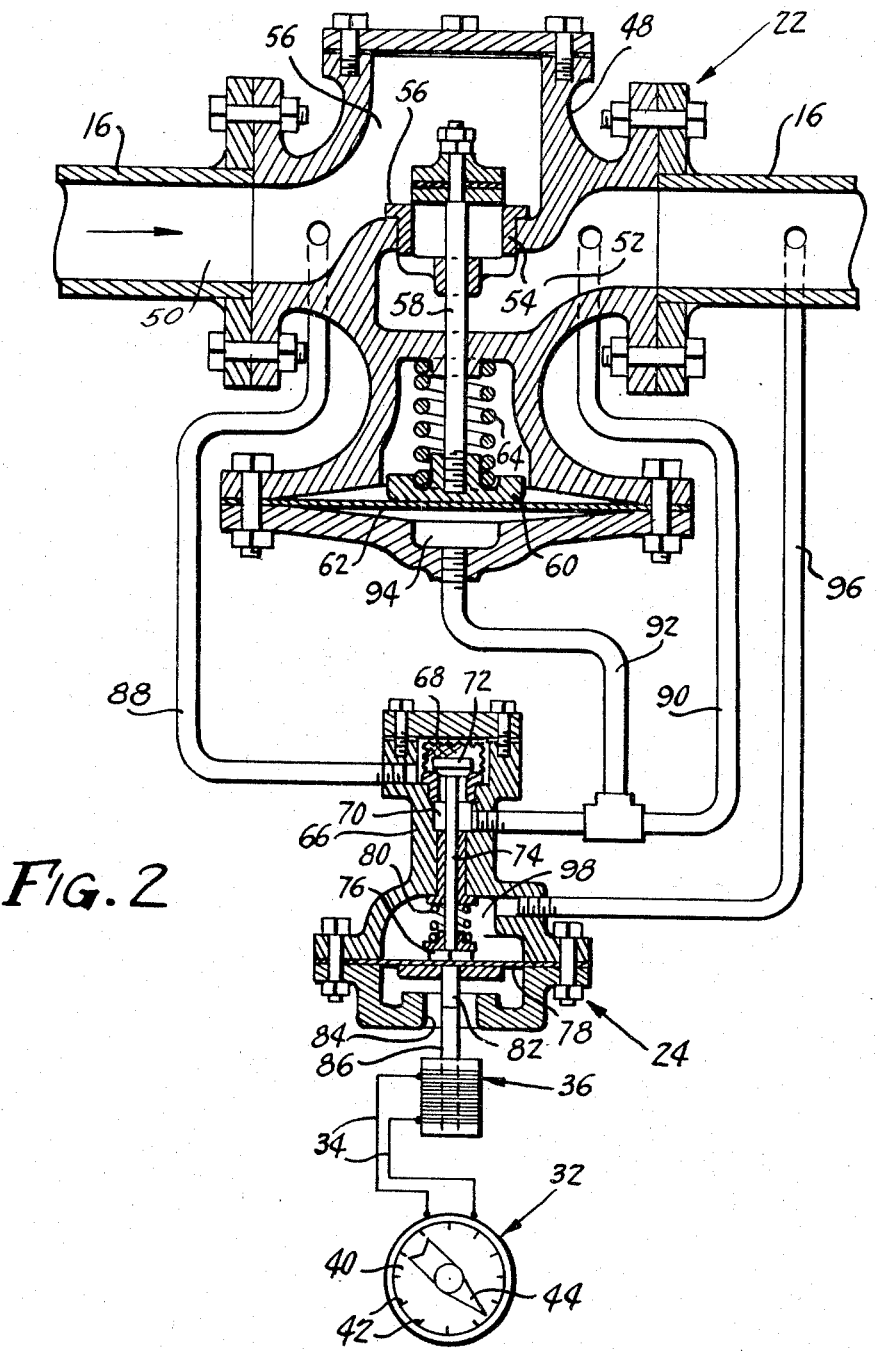
FIGURE 2 is an enlarged sectional view showing the details of a control arrangement for one particular cooking kettle line; and, FIGURE 3 is a schematic wiring diagram for the adjustable means included in the present invention.

If reference is now made to FIGURE 2, it will be seen that the main valve 22, mounted within the flow lines 16, includes a valve body 48 having an inlet or high pressure side 50 and an outlet or low pressure side 52. A main opening or aperture 54 permits flow from the high pressure side 50 to the low pressure side 52, unless such opening is closed by a main valve member 56. The valve member 56 is mounted adjacent one end of a valve stem 58, which, at its other end, designated 60, abuts against a pressure responsive diaphragm 62. A biasing spring 64 serves to maintain the end 60 in contact with the diaphragm 62.

The control or pilot valve 24 includes a valve body 66 having a high pressure side 68 and a low pressure side 70. Flow between these two sides is controlled by a valve member 72 mounted at one end of the valve stem 74. The other end 76 of the valve stem abuts against a pressure responsive diaphragm 78 and is maintained in such abutting relationship by a biasing spring 80. A small post or shaft 82 projects beyond the other side of the diaphragm 78 and extends through an opening 84 to abut against the end of a movable plunger 86 projecting from the electro-mechanical control device 36. As will be presently described, operation of the adjustable control unit 32 energizes the electro-mechanical control device 36 to move the pluger 86 to a particular location, and this movement of the plunger thus varies the bias exerted upon the control valve 24. In other words, the biasing force of the plunger 86 serves to normally move the valve member 72 to an opened condition.

A flow conduit 88 connects between the high pressure side 50 of the main valve and the high pressure side 68 of the control valve. Similarly, another conduit 90 connects between the low pressure side 52 of the main valve and the low pressure side 70 of the control valve. A branch conduit 92 extends from the conduit 90 to a recess 94 disposed beneath the pressure responsive diaphragm 62 of the main valve. Finally, another flow conduit 96 extends from the flow line 16, on the downstream side of the main valve 22, to a chamber or recess 98 adjacent the control valve diaphragm 78.

To understand the operation of the flow control means of FIGURE 2, it will be seen that in the condition shown, both the main valve member 56 and the control valve member 72 are in a seated or closed position. Now, let it be assumed that it is desired to supply a pressure to a steam kettle, and that the pressure on the downstream side of the main valve is too low. If such pressure is too low, it will be inadequate to properly bias the diaphragm 78 in the control valve to a position where the control valve member 72 remains seated. Accordingly, the control valve member 72 will open, and when this occurs, the high pressure from the inlet side of the main valve 50 will be transmitted through the line 88 to the high pressure side 68 of the control valve, from there past the control valve body to the low pressure side 70 thereof, and then through the conduits 90 and 92. The flow through the conduit 92 will enter the recess 94 and will exert an upward biasing pressure on the diaphragm 62 of the main valve, thereby serving to raise the main valve member 56 from its seated position. When this occurs, there will be a direct flow from the high pressure side 50 of the main valve to the low pressure side 52 thereof, and such flow will continue until the pressure on the downstream side of the main valve reaches the desired level.

When this occurs, such proper downstream pressure will be communicated through the conduit 96 to act upon the diaphragm 78 of the control valve, thereby seating the control valve member 72, and thus terminating communication between the conduits 88 and 90. The high pressure in the recess 94 beneath the diaphragm 62 can then bleed off through the conduit 92 and the conduit 90 to the low pressure side 54 of the main valve, and as this pressure bleeds off, it enables the diaphragm 62 to lower, thereby returning the main valve member 56 toward its seated position.

Although the foregoing description, as well as the illustration in FIGURE 2, show both the main and control valve members in a seated position, it should be understood that this is not the usual condition. Rather, in the usual operation of this invention, each of these valve members will operate most of the time at some position between fully seated and fully opened. Thus, the operation will not produce an "open-close" operation of these valves, but instead, will produce a modulation or regulation of their movement which constantly changes as line pressures change. For example, as line pressures drop too low, the valve members will start to move toward their fully opened position, and as they move in this direction, the quantity of flow through the valves, from the high pressure to the low pressure side, increases. This increase in flow causes a corresponding increase in pressure which, when communicated to the valve members, starts to move the same back toward the closed or seated position. However, before these valve members reach the seated position, the pressure ordinarily will again drop below its selected level, and the valves will again start to move back toward their fully opened position. Thus, it will be appreciated that the flow control system described herein is of the modulating type which attempts to assure that the pressure delivered to the downstream side of the line 16 will remain substantially constant. As aforesaid, the particular constant or substantially constant pressure level produced by the flow control means is predetermined by the adjustable means 20 which properly vary the bias on the control valve to thus make the same responsive to a particular pressure level.

Figure 3:
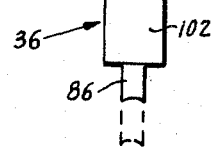

If attention is now directed to FIGURE 3, a specific adjustable control unit 32 is shown therein as a variable transformer whose power output is controlled by the position of the pointer 44. The variable transformer is powered by an input 100, and the output thereof, as varied by the position of the pointer 44, is transmitted through the electrical lead lines 34 to the electro-mechanical control device 36, which, for example, can be a solenoid having a body 102 and a plunger 86. The setting of the pointer 44 thus serves to electrically control the position of the movable plunger 86.

Although the operation of the present invention should be apparent from the foregoing detailed description, the same will be briefly reiterated again for purposes of completeness. Let it be assumed that the operator wants to produce a cooking temperature of approximately 280° F. at a particular cooking kettle 18. To accomplish this, the operator turns the pointer 44 to the particular calibration 42 corresponding to a temperature of 280° F. This setting of the pointer 44 will vary the output from the variable transformer, with such output being delivered via the electrical lead lines to the control device 36, to thereby cause the plunger 86 to move to a particular position. This movement of the plunger 86 causes a corresponding bias on the control valve member 72, with the amount or quantity of bias being predetermined by the degree of calibration of the control unit 32. That is, the degree of electrical output from the unit 32 to the device 36 is such as to cause a particular increment of movement of the plunger 86, such increment of movement producing a corresponding degree of bias on the control valve 24. This degree of bias is such as to in turn produce a corresponding bias on the main valve 22 so that the pressure flow therethrough will remain substantially constant at 40 pounds per square inch, a pressure corresponding to the selected temperature of 280° F. If the pressure flow through the main valve 22 varies appreciably from the preselected constant 40 pounds per square inch pressure, the flow control means, described hereinabove, will produce the aforementioned modulation necessary to maintain the pressure constant or substantially constant at the 40 pounds per square inch level. Thus, the valves 22 and 24 serve to assure that the steam flowing through the line 16 will reach the kettle 18 at a pressure of substantially 40 pounds per square inch, and, as aforesaid, this pressure produces a corresponding temperature of approximately 280° F.

It will thus be appreciated that regardless of the conditions within the upstream flow line 16, i.e., regardless of the temperature at which the heated fluid or steam is delivered from the source 12, it will always reach the particular kettle at the constant pressure desired, and will thus produce at the kettle a temperature corresponding to such constant pressure. It will also be appreciated that the system described herein needs no constant maintenance or re-setting, and once the pointer 44 has been set initially, the system will automatically function to assure that the pre-selected temperature will be produced at the cooking kettle 18.

The only time the operator need give any further attention to this particular kettle will be when and if he desires to change the temperature thereof. While the parts have been shown in FIGURE 2 as being coupled together in a particular manner, it will, of course, be understood that this was merely for purposes of illustration, and the invention is not necessarily limited to the particular orientation and arrangement of parts shown therein. Instead, the parts can be arranged in any position desired so long as each maintains its desired controlling effect upon the next associated part. That is, the arrangement of parts does not matter so long as their connection is such that the control unit 32 controls the control device 36, which in turn, controls the bias of the control valve 24, which in turn, controls the bias of the main valve 22.

After reading the foregoing detailed description, it should be apparent that the objects set forth at the outset of the specification have been successfully achieved by the present invention. Accordingly,

What is claimed is:

1. In a system for controlling the temperature of heated fluid supplied from a main line to a plurality of individual units to thereby control the temperature at said individual units and to assure that such temperature remains substantially constant, the improvement comprising:

a separate flow line coupling each unit to said main line;

a main valve interposed in each separate flow line for controlling the flow of heated fluid therethrough;

said main valve including a movable valve member whose position determines the quantity of flow of said heated fluid through said main valve and hence controls the pressure of the heated fluid delivered from said main valve to its associated unit;

a regulating valve coupled to each main valve to regulate the position of said movable valve member;

said regulating valve including an axially elongated valve member and a pressure responsive diaphragm reacting against said axially elongated valve member to adjust the position thereof; and, electro-mechanical adjustment means coupled with said regulating valve;

said electro-mechanical adjustment means including a linearly movable portion juxtaposed to said pressure responsive diaphragm on the side opposite to said axially elongated valve member;

said linearly movable portion reacting against said pressure responsive diaphragm and being axially aligned with said axially elongated valve member so that each incremental movement of said linearly movable portion causes a responsive movement of said axially elongated valve member by the same incremental amount;

said electro-mechanical adjustment means further including dial means calibrated in temperature and variable transformer means whose power output is varied in accordance with the setting of said dial means;

said variable transformer means controlling the amount of movement of said linearly movable portion whereby an attendant can set said dial means on the temperature desired at said unit and such setting will cause said variable transformer to move said linearly movable portion a prescribed incremental distance and such movement of said linearly movable portion will move said axially elongated valve member by said prescribed incremental distance to thus regulate the position of said main valve movable member until the main valve adjusts the pressure of said heated fluid being delivered to said unit to an amount which will produce said desired temperature at said unit.

2. The improvement defined in claim 1 wherein one end of said axially elongated valve member directly contacts said pressure responsive diaphragm.

3. The improvement defined in claim 2 wherein said diaphragm carries a small shaft member which abuts directly against said linearly movable portion, with said shaft member being axially aligned with said axially elongated valve member and said linearly movable portion.

References Cited by the Examiner
UNITED STATES PATENTS

| | | | |
|---|---|---|---|
| 594,346 | 11/1897 | Fortier | 237—9 X |
| 937,689 | 10/1909 | Paul | 237—9 |
| 1,180,638 | 4/1916 | Fabian | 236—92 |
| 2,040,109 | 5/1936 | Spence | 236—80 |
| 2,583,006 | 1/1952 | Niesemann | 137—489.5 X |
| 2,639,861 | 5/1953 | Skinner | 237—9 |
| 2,868,461 | 1/1959 | Gaddis | 237—9 |
| 3,256,904 | 6/1966 | Costa et al. | 137—376 |

FREDERICK L. MATTESON, JR., *Primary Examiner.*

ROBERT A. DUA, *Examiner.*